US012603987B2

(12) United States Patent
Talagala et al.

(10) Patent No.: US 12,603,987 B2
(45) Date of Patent: Apr. 14, 2026

(54) METHOD, SYSTEM AND PROGRAM FOR DATA PROCESSING

(71) Applicant: Arm Limited, Cambridge (GB)

(72) Inventors: Dumidu Sanjaya Talagala, Coventry (GB); Nerhun Yildiz, Loughborough (GB); David Hanwell, Sale (GB)

(73) Assignee: Arm Limited, Cambridge (GB)

( * ) Notice: Subject to any disclaimer, the term of this patent is extended or adjusted under 35 U.S.C. 154(b) by 176 days.

(21) Appl. No.: 18/353,229

(22) Filed: Jul. 17, 2023

(65) Prior Publication Data

US 2025/0030833 A1 Jan. 23, 2025

(51) Int. Cl.
| | |
|---|---|
| *G06V 20/56* | (2022.01) |
| *G06T 7/00* | (2017.01) |
| *G06T 7/11* | (2017.01) |
| *G06V 10/98* | (2022.01) |
| *H04N 17/00* | (2006.01) |

(52) U.S. Cl.
CPC ......... *H04N 17/002* (2013.01); *G06T 7/0002* (2013.01); *G06T 7/11* (2017.01); *G06V 10/993* (2022.01); *G06V 20/56* (2022.01); *G06T 2207/30168* (2013.01)

(58) Field of Classification Search
CPC .. G06V 20/56; G06V 30/1916; G06T 7/0002; G06T 7/11
See application file for complete search history.

(56) References Cited

U.S. PATENT DOCUMENTS

| | | | |
|---|---|---|---|
| 6,768,422 B2 * | 7/2004 | Schofield | ........... B60H 1/00785 340/602 |
| 6,891,960 B2 * | 5/2005 | Retterath | ......... G08G 1/096758 382/104 |
| 8,089,544 B2 * | 1/2012 | Funaki | ................... H04N 25/57 348/308 |
| 8,279,311 B2 * | 10/2012 | Lim | ........................ H04N 25/78 348/312 |
| 9,056,395 B1 * | 6/2015 | Ferguson | .............. G01S 17/931 |
| 10,688,913 B2 * | 6/2020 | Hiroi | .................... B60Q 1/1423 |
| 12,088,922 B2 * | 9/2024 | Talagala | ................... G06T 5/92 |
| 12,335,632 B2 * | 6/2025 | Talagala | ................ H04N 23/71 |
| 12,400,271 B2 * | 8/2025 | Grivel | .................... G06Q 40/08 |
| 2008/0117318 A1 * | 5/2008 | Aoki | ...................... H04N 25/68 348/246 |

OTHER PUBLICATIONS

Evaluating Functional Safety in Automotive Image Sensors; May 2018. (Year: 2018).*
Neural Auto exposure for High dynamic range object detection; 2021. (Year: 2021).*

* cited by examiner

*Primary Examiner* — Luis Perez-Fuentes
(74) *Attorney, Agent, or Firm* — EIP US LLP

(57) ABSTRACT

A method of data processing in a data processing system comprising a computer vision system. The method comprises obtaining image data representative of a plurality of pixels of an image, the image data comprising a plurality of pixel intensity values respectively representing said pixels. The method comprises identifying one or more compromised pixel intensity values in the plurality of pixel intensity values. The method comprises generating sensor defect state data relating to the identified compromised pixel intensity values. The method comprises performing, using the computer vision system, a feature recognition process on the image data. The method comprises performing an action based on the sensor defect state data.

19 Claims, 4 Drawing Sheets

100

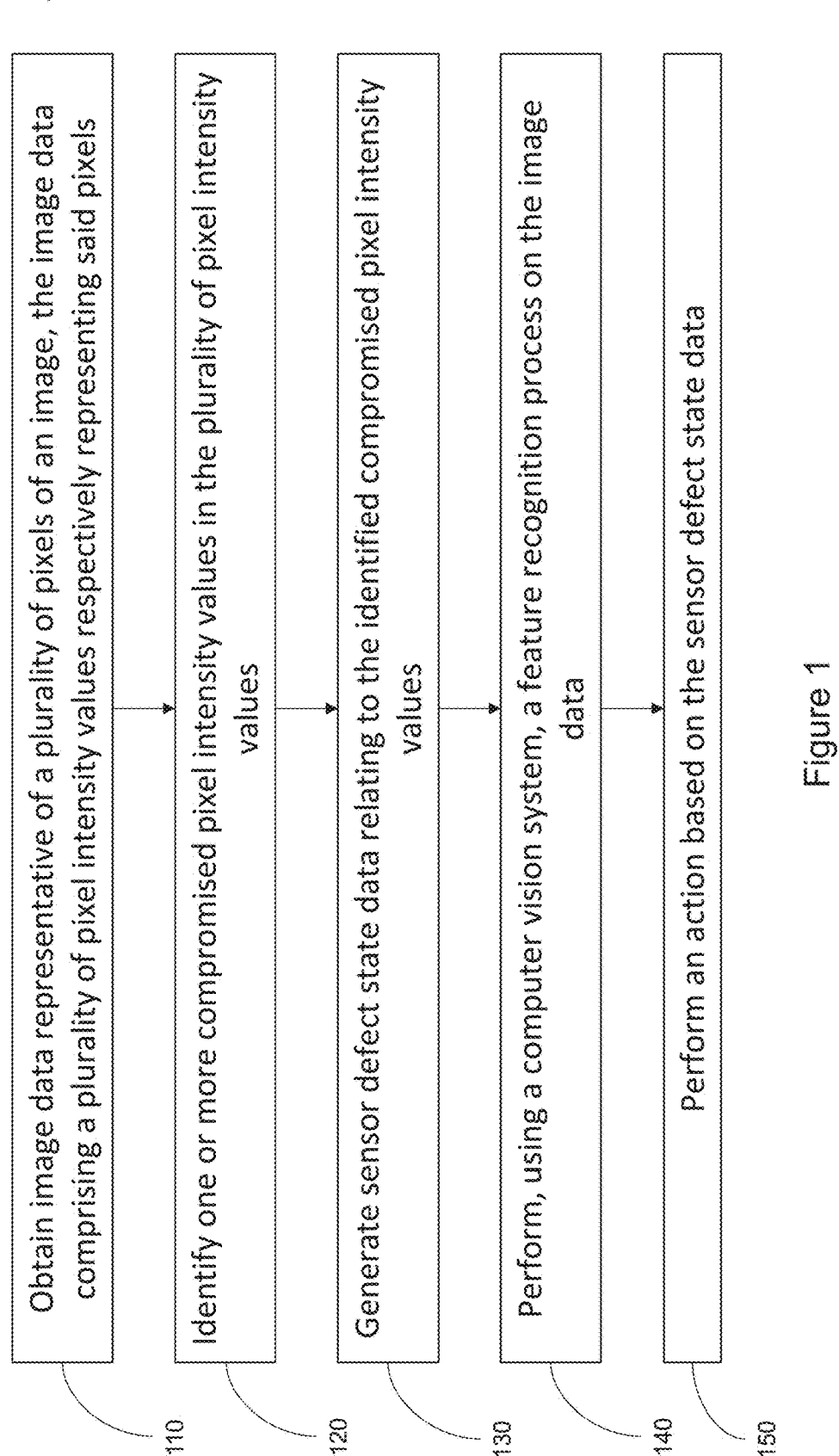

Obtain image data representative of a plurality of pixels of an image, the image data comprising a plurality of pixel intensity values respectively representing said pixels

110

Identify one or more compromised pixel intensity values in the plurality of pixel intensity values

120

Generate sensor defect state data relating to the identified compromised pixel intensity values

130

Perform, using a computer vision system, a feature recognition process on the image data

140

Perform an action based on the sensor defect state data

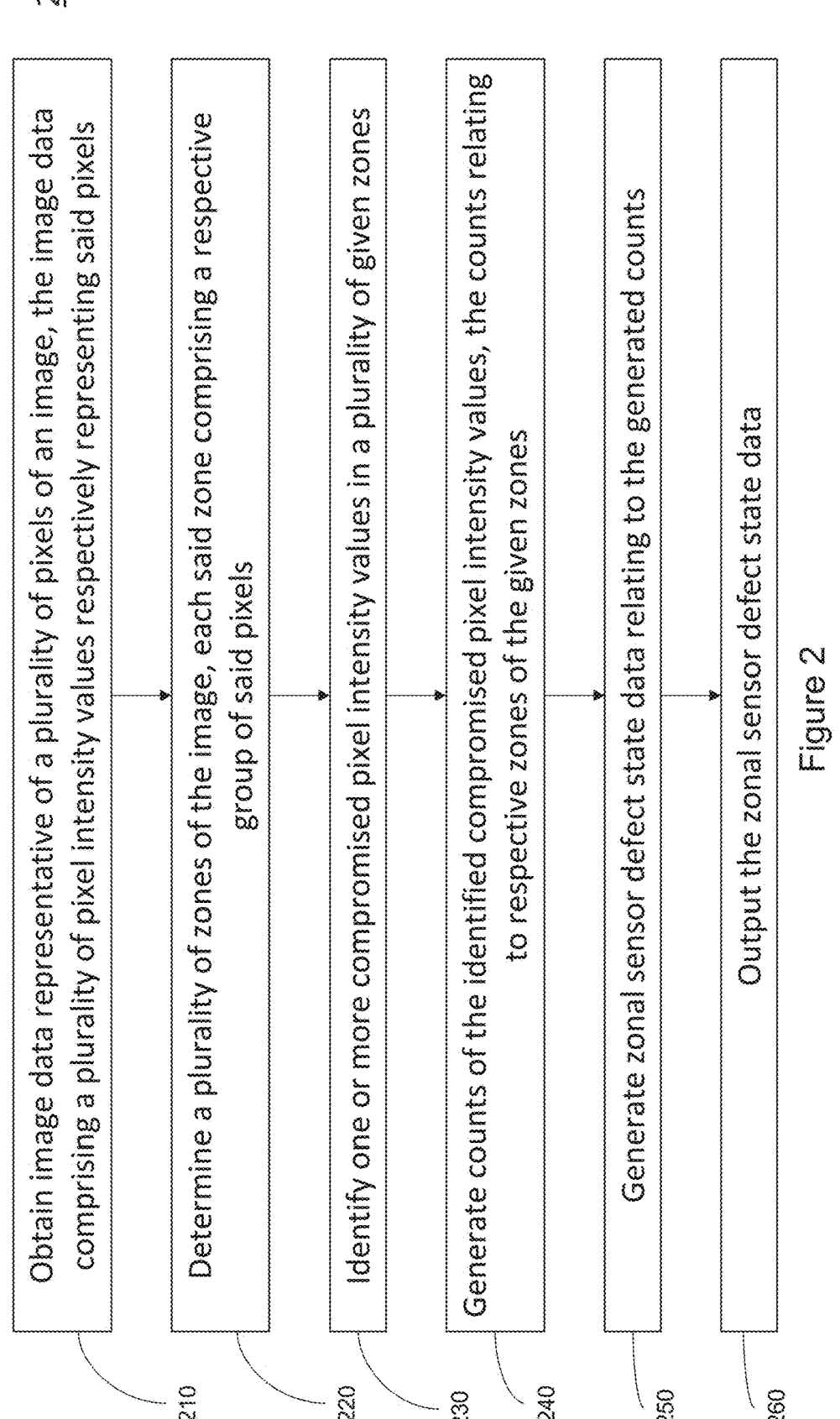

Obtain image data representative of a plurality of pixels of an image, the image data comprising a plurality of pixel intensity values respectively representing said pixels

210

Determine a plurality of zones of the image, each said zone comprising a respective group of said pixels

220

Identify one or more compromised pixel intensity values in a plurality of given zones

230

Generate counts of the identified compromised pixel intensity values, the counts relating to respective zones of the given zones

240

Generate zonal sensor defect state data relating to the generated counts

250

Output the zonal sensor defect state data

METHOD, SYSTEM AND PROGRAM FOR DATA PROCESSING

BACKGROUND OF THE INVENTION

Field of the Invention

The present invention relates to image processing and computer vision, and in particular to computer vision methods operating on image data that may include compromised, or defective, pixel intensity values.

Description of the Related Technology

In computer vision methods, a feature recognition process may be performed on an image to identify features of the image. For example, in autonomous driving applications, an image sensor mounted to a vehicle capable of automatic driving can capture an image, and a computer vision system may be used to identify features of the image, such as other vehicles and road signs. Based on the content of the image, the vehicle may be maneuvered in a manner that responds to features of its environment.

However, computer vision systems can be very sensitive to small changes in the content of the image. A computer vision system may erroneously identify a feature, or fail to identify a feature, due to a small change in the content of the image.

SUMMARY

According to a first aspect of the present invention, there is provided a method of data processing in a data processing system comprising a computer vision system, the method comprising: obtaining image data representative of a plurality of pixels of an image, the image data comprising a plurality of pixel intensity values respectively representing said pixels; identifying one or more compromised pixel intensity values in the plurality of pixel intensity values; generating sensor defect state data relating to the identified compromised pixel intensity values; performing, using the computer vision system, a feature recognition process on the image data; and performing an action based on the sensor defect state data.

The sensor defect state data may comprise a defect likelihood for a given said pixel intensity value.

Performing the feature recognition process may comprise: determining a feature presence likelihood for a feature in the image; comparing the feature presence likelihood to a detection condition, wherein the detection condition is dependent on the sensor defect state data; and determining that the feature is present if the feature presence likelihood meets the detection condition.

The method may comprise: generating a count of the identified compromised pixel intensity values; and determining whether the count meets a sensor defect condition, wherein the sensor defect state data comprises a data element that represents whether the count meets the sensor defect condition.

The image data may have been captured by an image sensor mounted to a vehicle, and if it is determined that the count meets the sensor defect condition, the action may comprise: generating an alert that indicates that the sensor defect condition is met; and/or maneuvering the vehicle.

The image data may have been captured by an image sensor mounted to a vehicle, and the action may comprise maneuvering the vehicle.

The image data may be captured at a first time and the method may comprise: obtaining further image data representative of a plurality of further pixels of a further image, the further image data comprising a plurality of further pixel intensity values respectively representing said further pixels, wherein the further image data was captured at a second time later than the first time; identifying one or more further compromised pixel intensity values in the plurality of further pixel intensity values; comparing pixel locations corresponding to the identified compromised pixel intensity values to pixel locations corresponding to the identified further compromised pixel intensity values; and based on said comparison, identifying a movement of at least one of the identified compromised pixel intensity values.

Identifying the one or more compromised pixel intensity values may comprise comparing at least one of the plurality of pixel intensity values to a defect condition for detecting defects; and the action may comprise, in response to identifying the movement, modifying the defect condition to obtain a further defect condition for detecting defects.

The method may comprise correcting the one or more compromised pixel intensity values using a correction method for correcting defects; and the action may comprise, in response to identifying the movement, modifying the correction method to obtain a further correction method for correcting defects.

According to a second aspect of the present invention, there is provided a non-transitory computer-readable storage medium comprising instructions which, when executed by a computer, cause the computer to perform a method according to the first aspect.

According to a third aspect of the present invention, there is provided a data processing system configured to perform a method according to the first aspect.

According to a fourth aspect of the present invention, there is provided a method of image processing comprising: obtaining image data representative of a plurality of pixels of an image, the image data comprising a plurality of pixel intensity values respectively representing said pixels; determining a plurality of zones of the image, each said zone comprising a respective group of said pixels; identifying one or more compromised pixel intensity values in a plurality of given zones; generating counts of the identified compromised pixel intensity values, the counts relating to respective zones of the given zones; generating zonal sensor defect state data relating to the generated counts; and outputting the zonal sensor defect state data.

The method may comprise determining whether a count of the generated counts meets a zonal defect condition, and the zonal sensor defect state data may comprise a data element that represents whether the count meets the zonal defect condition.

The zonal sensor defect state data may comprise first zonal sensor defect state data relating to a first count of the generated counts, and second zonal sensor defect state data relating to a second count of the generated counts, and outputting the zonal sensor defect state data may comprise outputting the first zonal sensor defect state data at a first time, and outputting the second zonal sensor defect state data at a second time later than the first time.

The method may comprise: for each given zone, determining whether the respective count of the generated counts meets a zonal defect condition; and determining a number of the given zones in which the respective count meets the zonal defect condition, and the zonal sensor defect state data may comprise a data element representing the number.

The plurality of given zones may form a given macro-zone of a plurality of macro-zones of the image.

The method may comprise, based on the generated counts, determining whether a collective count of the one or more compromised pixel intensity values for the image meets a sensor defect condition, and the zonal sensor defect state data may comprise a data element representing whether the collective count meets the sensor defect condition.

The plurality of zones may comprise a further zone, and the method may comprise: identifying one or more compromised pixel intensity values in the further zone; generating a further count of the identified compromised pixel intensity values in the further zone; generating further zonal sensor defect state data relating to the further count; and outputting the further zonal sensor defect state data, and outputting the zonal sensor defect state data may be performed at a first time, and outputting the further zonal sensor defect state data may be performed at a second time later than the first time.

The image data may have been captured by an image sensor, the plurality of pixel intensity values may represent said pixels at a first capture time, the one or more compromised pixel intensity values may form a first set of compromised pixel intensity values, and the method may comprise: obtaining further image data representative of a further image captured by the image sensor, the further image data comprising a plurality of further pixel intensity values respectively representing, at a second, different, capture time, at least the pixels in a particular zone, wherein the plurality of further pixel intensity values comprises a second set of one or more compromised pixel intensity values; identifying compromised pixel intensity values in the particular zone; generating a later count of the identified compromised pixel intensity values, the later count relating to the particular zone; generating further sensor defect state data relating to the later count; and comparing the zonal sensor defect state data with the further sensor defect state data, thereby monitoring a change in a defect state of the image sensor.

BRIEF DESCRIPTION OF THE DRAWINGS

FIG. 1 shows a flow diagram showing a method of data processing according to some examples.

FIG. 2 shows a flow diagram showing a method of image processing according to some examples.

DETAILED DESCRIPTION OF CERTAIN INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the case of explanation and understanding of the concepts underlying the examples.

FIG. 1 is a flow diagram showing a method of data processing in a data processing system 400 comprising a computer vision system 440. Any feature of the method of data processing described herein may also be a feature of the method of image processing described with reference to FIG. 2 below, and vice versa.

At a first step 110, the method may comprise obtaining image data representative of a plurality of pixels of an image, the image data comprising a plurality of pixel intensity values respectively representing said pixels. The image data may be obtained directly or indirectly from one or more image sensors, as described below with reference to FIG. 4. An image sensor from which the image data is obtained may be mounted to a vehicle. The data processing system 400 may comprise automatic driving functionality executed by an automatic driving system 450. The automatic driving functionality may be configured to maneuver the vehicle. The image data may be representative of only a portion 300 of the image.

Figure 3:
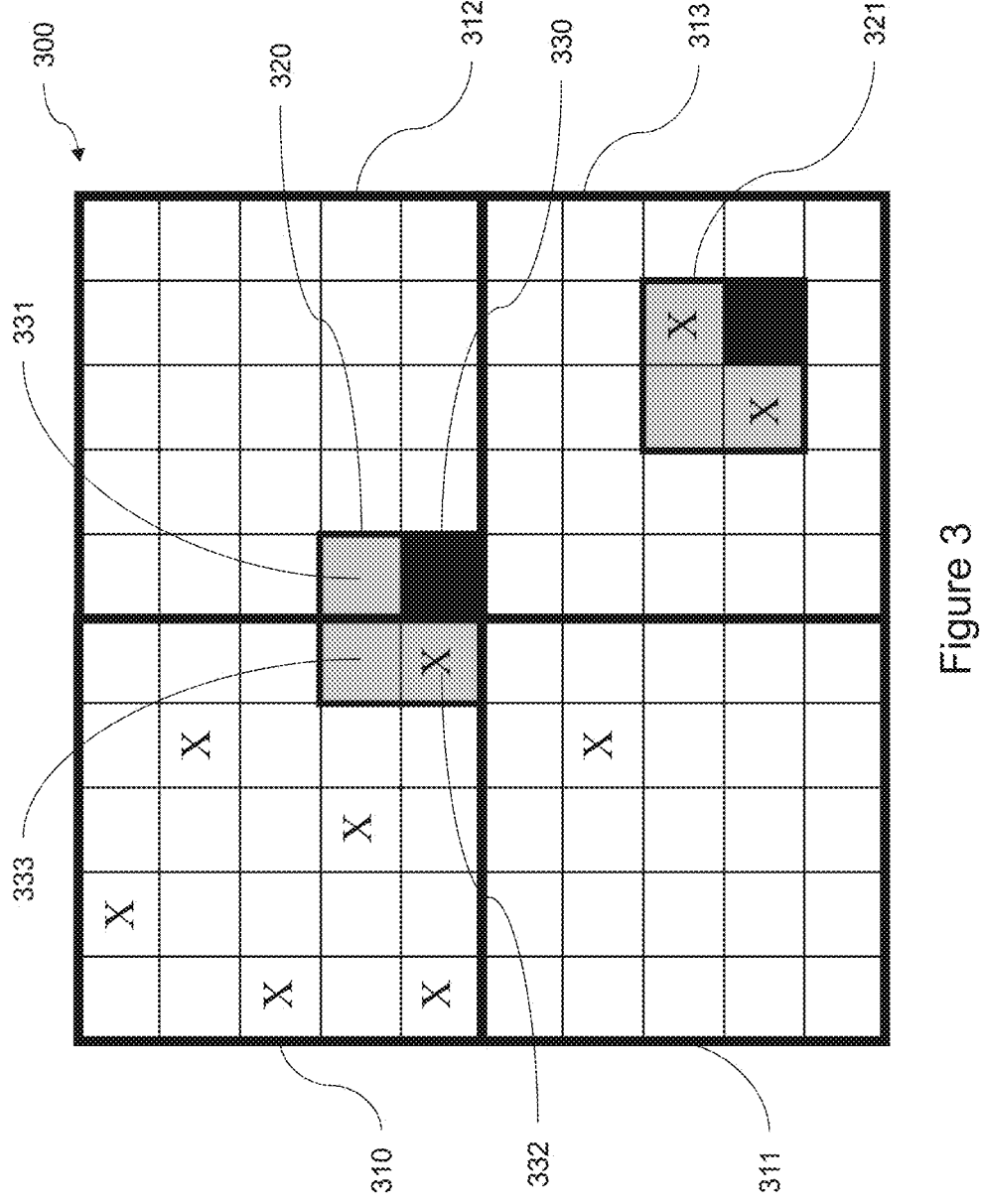
FIG. 3 shows schematically an arrangement of zones of a portion of the image according to some examples.

Image sensors may comprise an array of sensor elements, also referred to as sensor pixels. The sensor elements may each comprise a photosensitive element, also called a photosensor, for example a photodiode that can convert incident light into electronic signals or data. The sensor elements may comprise any photosensor suitable for capturing images. Further examples of photosensitive elements may include charge-coupled devices (CCDs) or complementary metal-oxide semiconductors (CMOSs). When capturing frames of image data, the image sensor may be exposed to incident light for a predetermined period of time, called an exposure interval. Alternatively, the image sensor may be continually exposed to incident light and signals from the sensor may be read over a given period of time which may also be referred to as an exposure interval. During this exposure interval, incident photons are converted into electrons by the photosensor and the charge may be stored by a capacitor. Each sensor element may further comprise circuitry configured to measure the charge stored by their respective capacitor and to convert the amount of charge stored to a digital value. The pixel intensity values may comprise these digital values. Alternatively, pre-processing may be applied to the digital values to obtain the pixel intensity values. The pixel intensity values may represent at least one characteristic of the light captured by an image sensor. The pixel intensity values may be representative of an amount of light energy incident on each sensor element during the exposure interval, and the amount of light energy may be proportional to the number of photons captured by that sensor element. The pixel intensity values may represent a luminance of captured light, which is for example a measure of the energy per unit area rather than absolute energy. In other examples, the image data may be representative of a brightness of captured light, which may be considered to correspond to a perception of luminance, which may or may not be proportional to luminance. The pixel intensity values may be associated with respective pixel locations. An example of a plurality of pixels having respective pixel locations is illustrated in FIG. 3. The pixel locations may be represented by pixel location data. The image data may be representative of any photometric quantity or characteristic that may be used to represent the visual appearance of the images represented by the image data. The image data may be generated and/or stored in any suitable format, for example raw image format.

The pixel intensity values may comprise one or more compromised pixel intensity values. A compromised pixel intensity value may be a pixel intensity value which is incorrect, for example, a pixel intensity value which does not accurately represent the amount of light incident on the sensor pixel or on a respective lens of the sensor pixel. A compromised pixel intensity value may be caused by a defect. A defect may cause the sensor pixel to output a particular pixel intensity value regardless of the amount of light incident on the sensor pixel or on the respective lens of the sensor pixel. A defect may cause the sensor pixel to output the same particular pixel intensity value over multiple frames, regardless of the amount of light incident on the sensor pixel or on the respective lens of the sensor pixel. In some examples, the pixel location data may identify one or more defect pixel locations. Defects may have developed during a manufacturing process of the image sensor. The image sensor may store the pixel location data of such inherent defects, for example in one time programmable (OTP) memory. Additionally, or alternatively, defects may develop over time after manufacture. A defect may comprise a hot pixel, where the sensor pixel outputs a maximum pixel intensity value that can be output by the image sensor. Alternatively, a defect may comprise a dead pixel, where the pixel intensity value is a minimum pixel intensity value that can be output by the image sensor. Alternatively, the defect may result in the image sensor outputting a value between the minimum pixel intensity value and the maximum pixel intensity value.

At a second step 120, the method may comprise identifying one or more compromised pixel intensity values in the plurality of pixel intensity values. Identifying the one or more compromised pixel intensity values may comprise retrieving from the one time programmable memory the pixel location data of inherent defects. Additionally, or alternatively, identifying the one or more compromised pixel intensity values may comprise detecting a compromised pixel intensity value. For example, identifying the one or more compromised pixel intensity values may comprise comparing at least one of the plurality of pixel intensity values to a defect condition for detecting defects. Comparing at least one of the plurality of pixel intensity values to the defect condition may comprise comparing a given pixel intensity value to one or more adjacent pixel intensity values having pixel locations near a pixel location of the given pixel intensity value; and based on said comparison, determining that the given pixel intensity value comprises a compromised pixel intensity value. Identifying the one or more compromised pixel intensity values may comprise determining a defect likelihood for the pixel intensity value. The defect likelihood may be calculated by subtracting the median of the adjacent pixel intensity values, or another value representative of the adjacent pixel intensity values, from the given pixel intensity value, and dividing the result by a normalizing factor. The normalizing factor may be an estimate of noise occurring in the image, and/or may represent an expected variation (such as a standard deviation) in the adjacent pixel intensity values or in a further set of adjacent pixel intensity values having pixel locations near the pixel location of the given pixel intensity value. Alternatively, if the given pixel intensity value is a maximum pixel intensity value that can be output by the image sensor, the defect likelihood may be set to a fixed value. If the given pixel intensity value is a minimum pixel intensity value that can be output by the image sensor, the defect likelihood may be set to a further fixed value, which may be the same as the fixed value. The defect likelihood may represent the probability that the given pixel intensity value is a compromised pixel intensity value. The probability may be determined by applying a function to the defect likelihood. The steps relating to identifying one or more compromised pixel intensity values may be applied to all of the plurality of pixel intensity values. By determining defect likelihoods for individual pixels, an action may be performed based on fine-grained information on the likelihood and the spatial location of defects.

In some examples, the method comprises generating a count of the identified compromised pixel intensity values. The count may be related to a zone of an image, as described below with reference to FIG. 2.

At a third step 130, the method may comprise generating sensor defect state data relating to the identified compromised pixel intensity values.

In some examples, the sensor defect state data comprises a defect likelihood for a given said pixel intensity value. The sensor defect state data may comprise a defect likelihood for each of the plurality of pixel intensity values.

In some examples, the method comprises determining whether the count meets a sensor defect condition. The sensor defect condition may comprise a threshold number of compromised pixel intensity values. The threshold number of compromised pixel intensity values may be a fixed percentage of the number of pixel intensity values in the image data. For example, the threshold number of compromised pixel intensity values may be 1% or 5% of the number of pixel intensity values. If the sensor defect condition is met, it may be determined that the sensor is not suitable for performing a feature recognition process. The sensor defect state data may comprise a data element that represents whether the count meets the sensor defect condition.

At a fourth step 140, the method may comprise performing, using a computer vision (CV) system 440, a feature recognition process. A data processing system 400 for performing the method may comprise the CV system 440. The method may comprise, prior to performing the feature recognition process, providing the image data, and optionally the sensor defect state data, to the CV system 440. The feature recognition process may include the processing of the image data to extract relatively high-level information describing content of the image data. The CV system 440 may comprise artificial neural networks (ANNs) such as convolutional neural networks (CNN) to extract this information. The feature recognition process may include performing object detection and/or recognition. The feature recognition process may include other tasks such as motion estimation, scene reconstruction or image restoration. In some examples, the feature recognition process includes performing simultaneous localization and mapping (SLAM). SLAM comprises generating and/or updating a map of an environment whilst simultaneously determining and/or tracking a location of a sensor within the environment. SLAM processing may involve identifying and locating objects in the environment, and using those identified objects as semantic "landmarks" to facilitate the accurate and/or efficient mapping of the environment. The data processing system 400 may comprise a boundary detection system, which detects a boundary between a region of pixels having one range of pixel intensity values and a region of pixels having a different range of pixel intensity values, are prone to be falsely identified in the vicinity of a defect cluster 321. Based on an output of the CV system 440, an automatic driving system 450 of the data processing system 400 may maneuver the vehicle.

In some examples, performing the feature recognition process comprises determining a feature presence likelihood for a feature in the image. The feature may comprise, for example, an edge, an object, or a region of the image in which the pixel intensity values are constant. For example, a CNN of the CV system 440 may be configured to output a feature presence likelihood for a given feature. Performing the feature recognition process may comprise comparing the feature presence likelihood to a detection condition, wherein the detection condition is dependent on the sensor defect state data. The detection condition may comprise a threshold. The threshold may be a threshold for a feature presence probability, the feature presence probability corresponding to the feature presence likelihood. The threshold may be dependent on the sensor defect state data. For example, the threshold may be dependent on the defect likelihoods of one or more pixels having pixel locations in a region of the feature. For example, the threshold may be dependent on a mean of the defect likelihoods of the one or more pixels. The region of the feature may comprise a region in which the feature is fully or partially contained. The region may comprise one or more zones, described below with reference to FIG. 2, in which part of the feature is present. Performing the feature recognition process may comprise determining that the feature is present if the feature presence likelihood meets the detection condition. For example, if it is determined that there are no compromised pixel intensity value in the region of the feature, the threshold for the feature presence probability may be 0.6, while if it is determined that there are one or more compromised pixel intensity values in the region, the threshold may be 0.8. By making the feature detection process defect-dependent, the CV system 440 may more reliably detect true features and avoid detecting features which are artefacts caused by defects.

At a fifth step 150, the method may comprise performing an action based on the sensor defect state data.

In some examples, where the image data is captured by an image sensor mounted to a vehicle, the action comprises maneuvering the vehicle. If it is determined that the count of the identified compromised pixel intensity values meets a sensor defect condition, the action may comprise generating an alert that indicates that the sensor defect condition is met, and/or maneuvering the vehicle. Alternatively, the action may comprise generating an alert that indicates that the sensor defect condition is met, and/or maneuvering the vehicle, if it is determined that a zonal defect condition is met in a threshold number of zones; the zonal defect condition will be described further below with reference to FIG. 2. The alert may be displayed in the dashboard of the vehicle. The alert may indicate that the image sensor cannot safely be used for automatic driving functionality. The alert may indicate that the image sensor needs to be replaced. By generating an alert that indicates that the sensor defect condition is met and/or maneuvering the vehicle, an accident involving the vehicle may be avoided.

Where it is determined that the count of identified compromised pixel intensity values meets a sensor defect condition, maneuvering the vehicle may comprise slowing the vehicle down, and/or identifying a place to safely stop the vehicle such as a parking space and stopping the vehicle in the place. Alternatively, where it is determined that the count of identified compromised pixel intensity values meets a sensor defect condition, the action may comprise disabling the automatic driving system 450. The action may comprise generating an alert indicating that the automatic driving system 450 will be disabled. The alert may also indicate a request that a passenger of the vehicle begin manual driving of the vehicle.

Maneuvering the vehicle may comprise maneuvering the vehicle in response to an indication that the sensor defect state data meets a certain condition. For example, where a feature is detected in a region where the number of compromised pixel intensity values meets a certain condition, the maneuvering may be performed in such a way as to ignore the feature. This may be appropriate where the feature is an artefact of the compromised pixel intensity values and does not represent a true feature of the scene.

In some examples, the image data was captured at a first time and the method comprises obtaining further image data representative of a plurality of further pixels of a further image, the further image data comprising a plurality of further pixel intensity values respectively representing said further pixels. The further image data may have been captured at a second time later than the first time. The second time may be less than a minute after the first time. The further image data may have been captured by the same image sensor as the image data. The image data and the further image data may correspond to two adjacent frames in a series of frames captured by the image sensor. The method may comprise identifying one or more further compromised pixel intensity values in the plurality of further pixel intensity values. The method may comprise comparing pixel locations corresponding to the identified compromised pixel intensity values to pixel locations corresponding to the identified further compromised pixel intensity values. Each pixel intensity value of the image data may have a corresponding further pixel intensity value in the further image data that corresponds to the same pixel location. Comparing the pixel locations may comprise determining that a compromised pixel intensity value has appeared, disappeared or apparently moved. For example, it may be determined that a first pixel intensity value having a first pixel location is identified as compromised, but a first further pixel intensity value having the first given pixel location is not identified as compromised in the further image data, such that a compromised pixel intensity value has disappeared. Additionally, or alternatively, it may be determined that a second pixel intensity value having a second pixel location is not identified as compromised, but a second further pixel intensity value having the second pixel location is identified as compromised in the further image data, such that a compromised pixel intensity value has appeared. The above determinations may instead be made on the appearance, disappearance or apparent movement of defect clusters 321. Defect clusters 321 are described below with reference to FIG. 2. Where it is determined that both a compromised pixel intensity value has disappeared and a compromised pixel intensity value has appeared, it may be further determined that the compromised pixel intensity value that disappeared has apparently moved. Thus, the method may comprise, based on said comparison, identifying a movement of at least one of the identified compromised pixel intensity values.

The appearing, disappearing and movement may be caused by a feature of the image and/or the further image. For example, the headlights of other vehicles may be sufficiently bright to cause pixel intensity values representing the headlights to be high enough to meet the defect condition. Thus, even when the pixel intensity values do not actually represent defective pixels, a defect detection method may erroneously classify the pixel intensity values as compromised pixel intensity values. By identifying the appearing, disappearing or movement, appropriate action may be taken to prevent an accident involving the vehicle from occurring.

In examples where identifying the one or more compromised pixel intensity values comprises comparing at least one of the plurality of pixel intensity values to a defect condition for detecting defects, the action may comprise, in response to identifying the movement, modifying the defect condition to obtain a further defect condition for detecting defects. Modifying the defect condition may comprise adjusting the above-mentioned threshold for defect likelihood, or mean thereof, at which it is determined that a pixel intensity value is a compromised pixel intensity value. The threshold may be adjusted upwards. The method may comprise comparing, to the further defect condition, at least one of: at least one of the plurality of pixel intensity values, at least one of the plurality of further pixel intensity values, or at least one of a plurality of yet further pixel intensity values respectively representing a plurality of yet further pixels of a yet further image, wherein the method comprises obtaining yet further image data representative of the plurality of yet further pixels. The yet further image data may have been captured a third time. The third time may be later than the first time and/or the second time. By modifying a defect condition, future erroneous classifications of pixel intensity values as compromised pixel intensity values may be avoided.

In some examples, the method comprises correcting the one or more compromised pixel intensity values using a correction method for correcting defects. The correction method may comprise, for example, replacing a given compromised pixel intensity value with an interpolated value. The interpolated value may be between the given compromised pixel intensity value and a median value of the adjacent pixel intensity values. The interpolated value may be calculated based on a correction parameter, wherein the higher the correction parameter is, the closer the interpolated value is to the median value, for a fixed median value and given compromised pixel intensity value. Alternatively, the correction method may comprise replacing the given compromised pixel intensity value with the median value. The correction method may apply different correction functions to different types of compromised pixel intensity value. For example, the correction method may comprise applying a first correction function to a compromised pixel intensity value representing a hot pixel and a second correction function to a compromised pixel intensity value representing a dead pixel. The action may comprise, in response to identifying the movement, modifying the correction method to obtain a further correction method for correcting defects. Modifying the correction method may comprise reducing the correction parameter. Alternatively, modifying the correction method may comprise disabling the correction method. Additionally, or alternatively, modifying the correction method may comprise disabling the correction method in respect of a subset of types of compromised pixel intensity values. For example, the method may comprise modifying the first correction function so that hot pixels are not corrected, but the modification may leave other correction functions applied to other types of defect unaffected. The method may comprise correcting, using the further correction method, at least one of: at least one of the plurality of pixel intensity values, at least one of the plurality of further pixel intensity values, or at least one of the plurality of yet further pixel intensity values. Where it is observed that pixel intensity values are being erroneously classified as compromised pixel intensity values, modifying the correction method may prevent pixel intensity values from being erroneously changed by the correction method.

The action may comprise any action taken by the CV system 440 based on the sensor defect state data.

FIG. 2 is a flow diagram showing a method of image processing.

At a first step 210, the method may comprise obtaining image data representative of a plurality of pixels of an image, the image data comprising a plurality of pixel intensity values respectively representing said pixels.

At a second step 220, the method may comprise determining a plurality of zones of the image, each said zone comprising a respective group of said pixels. A group of said pixels may be a subset of the pixels of the whole image. The plurality of zones may form a portion 300 of the image, or the whole image. Determining the plurality of zones may comprise splitting the image into the plurality of zones.

Each zone may comprise a rectangle of pixels of any dimensions. Some of the zones may collectively form a 16×16 grid, such that there are 256 zones in the image in total. Such a zone may be referred to as a macro-zone 313; however, as described below, the dimensions of a macro-zone are not limited in this way. FIG. 3 shows schematically an arrangement of zones of a portion 300 of the image. Four example macro-zones 310, 311, 312, 313 are depicted in FIG. 3. Alternatively, a zone may be a square of pixels containing four pixels in total, such that its respective group of pixels contains four pixels. Such a zone may be referred to as a micro-zone 321. Two example micro-zones 320, 321 are depicted in FIG. 3. The zones may overlap; for example, a micro-zone 320 may overlap with two macro-zones 310, 312, such that the micro-zone 320 comprises a portion that overlaps with a first macro-zone 310 and a portion that overlaps with a second macro-zone 312. In general, irrespective of the number and size of macro-zones and the number and size of micro-zones, micro-zones are smaller than macro-zones.

The size and shape of, and number of pixels contained by, the zones are not limited to the above-described examples.

At a third step 230, the method may comprise identifying one or more compromised pixel intensity values in a plurality of given zones. Example pixels represented by compromised pixel intensity values are indicated in FIG. 3 with the letter X. Identifying a compromised pixel intensity value in a given zone may comprise identifying a compromised pixel intensity value that represents a pixel in the respective group of pixels. The plurality of given zones may be any subset of the plurality of zones, or all of the plurality of zones.

The plurality of given zones may comprise a plurality of micro-zones 321, 320. Each micro-zone of the plurality of micro-zones may comprise a chief pixel 330. Each micro-zone may comprise an upper pixel 331 immediately above the chief pixel, a left pixel 332 immediately to the left of the chief pixel, and an upper left pixel 333 immediately above the left pixel 332. The plurality of micro-zones may comprise one micro-zone for each pixel in the image, except for the pixels in the top row and the leftmost column of the image. It will be appreciated that the chief pixel 330 may be redefined as, for example, the bottom-left pixel in a micro-zone and the example of the chief pixel 330 being the bottom-right pixel is not limiting.

At a fourth step 240, the method may comprise generating counts of the identified compromised pixel intensity values, the counts relating to respective zones of the given zones. Generating a count relating to a respective zone may comprise counting the number of compromised pixel intensity values identified in the respective zone. The count may be a total number of compromised pixel intensity values identified in the respective zone. The generated counts may relate respectively to all of the given zones.

At a fifth step 250, the method may comprise generating zonal sensor defect state data relating to the generated counts.

The zonal sensor defect state data may comprise a data element representing the count for a particular zone of the given zones, or said data elements for all of the given zones. Where the zonal sensor defect state data comprises such a data element, the zones may be the macro-zones 310, 311, 312, 313 described above. Such a data element may consist of 16 bits. By counting the number of compromised pixel intensity values in a particular zone, rather than across the whole image, data can represent a defect state of the image sensor at a more granular level.

In some examples, the method comprises determining whether a count of the generated counts meets a zonal defect condition, wherein the zonal sensor defect state data comprises a data element that represents whether the count meets the zonal defect condition. The method may comprise, for each given zone, determining whether a count of the generated counts meets a zonal defect condition, and the zonal sensor defect state data may comprise a data element for each given zone that represents whether the count in that given zone meets the zonal sensor defect condition. The zonal sensor defect conditions may be different for different zones. Meeting the zonal defect condition may comprise exceeding a threshold. Where a zone is a macro-zone 313, the threshold may be equal to five compromised pixel intensity values, for example where there are a total of 16×16 zones in the image. An example macro-zone 310 in which the threshold is exceeded is indicated in FIG. 3. Where a zone is a micro-zone 321, the threshold may be equal to one compromised pixel intensity value. An example micro-zone 321 in which the threshold is exceeded is indicated in FIG. 3. The data element may consist of 1 bit. Any action taken in response to determining that a defect condition or sensor defect condition is met, as described with reference to FIG. 1, may be taken in response to determining that the zonal defect condition is met. By determining whether a count meets a zonal defect condition, an action, such as maneuvering a vehicle, may be taken in response to a local defect state of the image sensor. For example, where a feature is identified by the CV system 440 in a zone in which the zonal defect condition is met, it may be determined the feature can be ignored.

In some examples, the method comprises, for each given zone, determining whether the respective count of the generated counts meets a zonal defect condition. Meeting the zonal defect condition may comprise exceeding a threshold. Where a zone is a macro-zone 313, the threshold may be equal to five compromised pixel intensity values. Where a zone is a micro-zone 321, the threshold may be equal to one compromised pixel intensity value. A micro-zone 321 in which the respective count meets the zonal defect condition may be referred to as a defect cluster 321. The method may comprise determining a number of the given zones in which the respective count meets the zonal defect condition, wherein the zonal sensor defect state data comprises a data element representing the number. The number of the given zones may be a total number of the given zones in which the respective count meets the zonal defect condition. The plurality of given zones may form a given macro-zone 313 of a plurality of macro-zones 310, 311, 312, 313 of the image. Specifically, in this example, the given zones may be micro-zones which collectively form a macro-zone 313. In general, defect clusters 321 are more likely to lead to false identifications of features by the CV system 440, such as structures and objects, than isolated defects which are not near any other defects. By identifying clusters of defects, appropriate action may be taken by the CV system 440, such as ignoring features in a zone identified as a defect cluster 321.

More generally, the zonal defect state data may comprise any data that relates to the generated counts. The zonal defect state data may comprise a ratio of count to zone size for a given zone. The zonal defect state data may comprise a mean value of the counts across all zones.

At a sixth step 260, the method comprises outputting the zonal sensor defect state data. Outputting the zonal sensor defect state data may comprise providing the zonal sensor defect state data to the CV system 440 and/or storing the zonal sensor defect state data in a data storage 420. The same applies to outputting any other data described herein. By outputting zonal sensor defect state data, an action may be performed based on the count of defects in a given zone.

In some examples, the zonal sensor defect state data comprises first zonal sensor defect state data relating to a first count of the generated counts. The first count may relate to a first zone. The zonal sensor defect state data may comprise second zonal sensor defect state data relating to a second count of the generated counts. The second count may relate to a second zone. Outputting the zonal sensor defect state data may comprise outputting the first zonal sensor defect state data at a first time, and outputting the second zonal sensor defect state data at a second time later than the first time. The first time may be earlier than a time at which the second count is generated and/or a time at which the second zonal sensor defect state data is generated. The first time may be earlier than a time at which a final count for a final given zone of the plurality of given zones is generated, where the final count is the last count of the counts to be generated. The CV system 440 may perform the feature detection process on the group of pixels in a first zone to which the first count relates, prior to performing the feature detection process on the group of pixels in a second zone to which the second count relates. By outputting the first count promptly, rather than after having generated all of the counts, the CV system 440 may take appropriate action to, for example, avoid an accident by maneuvering the vehicle, where it determines that such action does not depend on the second count or any features detected in the second zone.

In some examples, the method comprises generating a collective count of the one or more compromised pixel intensity values for the image. The collective count may comprise a count of the one or more compromised pixel intensity values across all of the given zones. The collective count may be generated by adding together the counts relating to respective zones of the given zones. The method may comprise generating collective sensor defect state data relating to the collective count. The method may comprise outputting the collective sensor defect state data. By outputting collective sensor defect state data, the data processing system 400 may be able to perform an action based on an overall defect state of the sensor. For example, as previously mentioned, if it is determined that the collective count meets a sensor defect condition, the action may comprise generating an alert that indicates that the sensor defect condition is met, allowing appropriate action to be taken, such as maneuvering the vehicle.

In some examples, the method comprises, based on the generated counts, determining whether the collective count of the one or more compromised pixel intensity values for the image meets a sensor defect condition, wherein the zonal sensor defect state data comprises a data element representing whether the collective count meets the sensor defect condition. Meeting the sensor defect condition may comprise exceeding a threshold. Determining whether the collective count meets the sensor defect condition may comprise successively adding the counts relating to respective zones to a cumulative count. Determining whether the collective count meets the sensor defect condition may comprise determining whether the cumulative count meets the sensor defect condition. If it is determined that the cumulative count does not meet the sensor defect condition, the count relating to another given zone may be added to the cumulative count. The steps of adding to the cumulative count and determining whether the cumulative count meets the sensor defect condition may be performed iteratively. Where the sensor defect condition is a threshold, for example, if the cumulative count meets the sensor defect condition then the collective count meets the sensor defect condition. Thus, determining whether the collective count meets the sensor defect condition may be performed prior to finishing generating all the counts relating to respective zones of the given zones. By outputting a data element representing whether the collective count meets the sensor defect condition promptly, the CV system 440 may take appropriate action promptly, such as maneuvering the vehicle.

In some examples, the plurality of zones comprises a further zone. The further zone may be a zone that is not one of the given zones. The method may comprise identifying one or more compromised pixel intensity values in the further zone. The method may comprise generating a further count of the identified compromised pixel intensity values in the further zone. The method may comprise generating further zonal sensor defect state data relating to the further count. The method may comprise outputting the further zonal sensor defect state data. Outputting the zonal sensor defect state data may be performed at a first time, and outputting the further zonal sensor defect state data may be performed at a second time later than the first time. The first time may be earlier than a time at which the further count is generated and/or a time at which the further zonal sensor defect state data is generated.

In some examples, the image data was captured by an image sensor. The plurality of pixel intensity values may represent said pixels at a first capture time. The first capture time may be a first exposure interval. The one or more compromised pixel intensity values may form a first set of compromised pixel intensity values. The method may comprise obtaining further image data representative of a further image captured by the image sensor, the further image data comprising a plurality of further pixel intensity values respectively representing, at a second, different, capture time, at least the pixels in a particular zone. The second capture time may be a second exposure interval. The second capture time may be later than the first capture time. The particular zone may comprise all of the given zones. The particular zone may contain no zones other than the given zones. The plurality of further pixel intensity values may comprise a second set of one or more compromised pixel intensity values. The second set of one or more compromised pixel intensity values may include compromised pixel intensity values at the same pixel locations as each of the first set of compromised pixel intensity values. The method may comprise identifying compromised pixel intensity values in the particular zone. Identifying compromised pixel intensity values in the particular zone may comprise retrieving the pixel locations of the first set of compromised pixel intensity values. Identifying compromised pixel intensity values in the particular zone may comprise detecting one or more compromised pixel intensity values each having pixel locations different from the pixel locations of the first set of compromised pixel intensity values. The method may comprise generating a later count of the identified compromised pixel intensity values, the later count relating to the particular zone. The method may comprise generating further sensor defect state data relating to the later count. The method may comprise comparing the zonal sensor defect state data with the further sensor defect state data, thereby monitoring a change in a defect state of the image sensor. The comparison may comprise comparing the later count with the collective count. The comparison may comprise subtracting the collective count from the later count, to obtain a difference representative of the number of pixels in the image sensor, or in the plurality of given zones, that became defective between the first capture time and the second capture time. The comparison may comprise dividing the difference by the time elapsed between the first capture time and the second capture time, to obtain an average rate at which pixels in the image sensor became defective between the first capture time and the second capture time.

Figure 4:
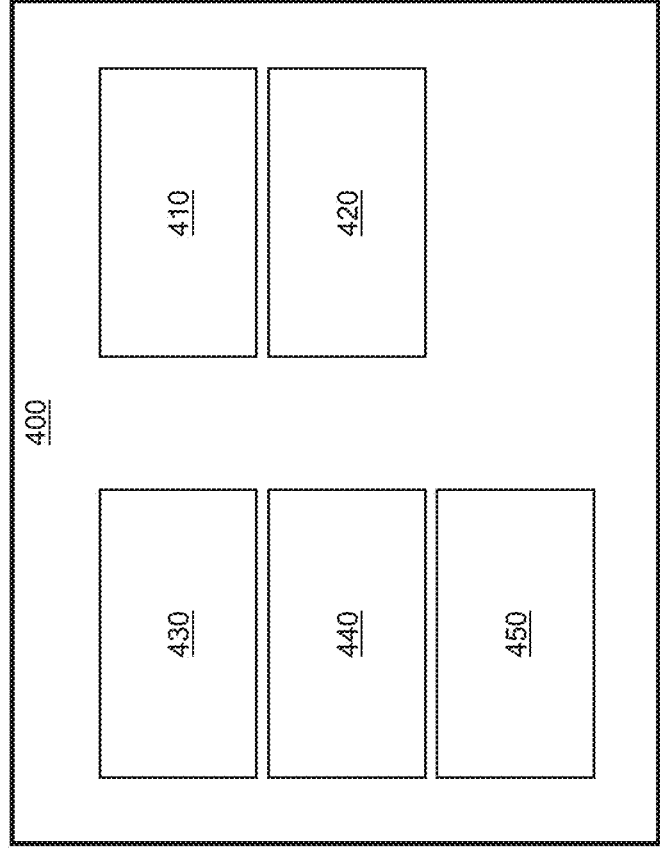
FIG. 4 shows a schematic diagram showing a data processing system according to some examples.

FIG. 4 shows data processing system 400 comprising at least one data processor 410 and data storage 420. The data storage 420 includes computer program code comprising instructions, the data storage 420 and the computer program code configured to, with the at least one processor 410, cause the data processing system 400 to perform the method 100 and/or the method 200 according to the examples described herein.

In particular, in method 100, the data processor 410 obtains image data representative of a plurality of pixels of an image, the image data comprising a plurality of pixel intensity values respectively representing said pixels. The data processor 410 identifies one or more compromised pixel intensity values in the plurality of pixel intensity values. The data processor 410 generates sensor defect state data relating to the identified compromised pixel intensity values. The data processor 410 performs, using the CV system 440, a feature recognition process on the image data. The data processor 410 performs an action based on the sensor defect state data.

In method 100, the data processing system 400 may comprise an image signal processing system 430 that performs steps 110 to 130. The image signal processing system 430 may provide the image data, and optionally the sensor defect state data, to the CV system 440. The CV system 440 may perform step 140. The data processing system 400 may comprise an automatic driving system 450. The automatic driving system 450 may carry out the above-mentioned automatic driving functionality, including maneuvering the vehicle. Step 150 may be performed by the CV system 440, the image signal processing system 430, the automatic driving component, or any combination thereof. The boundary detection system mentioned above may form part of the image signal processing system 430, the CV system 440, or both.

In method 200, the data processor 410 obtains image data representative of a plurality of pixels of an image, the image data comprising a plurality of pixel intensity values respectively representing said pixels. The data processor 410 determines a plurality of zones of the image, each said zone comprising a respective group of said pixels. The data processor 410 identifies one or more compromised pixel intensity values in a plurality of given zones. The data processor 410 generates counts of the identified compromised pixel intensity values, the counts relating to respective zones of the given zones. The data processor 410 generates zonal sensor defect state data relating to the generated counts. The data processor 410 outputs the zonal sensor defect state data.

The data storage 420 may store any sensor defect state data, including the zonal sensor defect state data. The data storage 420 may store any image data, including the further image data.

The data processing system 400 may be comprised in a suitable computing device, such as a smartphone, a digital camera, or a computer. The data processing system 400 may be comprised in a vehicle. In some examples, the data processing system 400 is located in a device comprising at least one image sensor for generating one or more frames of image data. In other examples, the data processing system 400 may be comprised in a computing device without image capturing capabilities but which may be communicatively coupled to an image capture device. The data processing system 400 may be communicatively coupled to an image capture device over a local area network or a wide area network by any suitable wired or wireless communication means. The data processing system 400 may be an application specific integrated circuit. The application specific integrated circuit may include any number of processors, microprocessor, and/or memory blocks, including RAM, ROM, EEPROM, or flash memory. The application specific integrated circuit may comprise an image signal processor, configured to process image data according to the method 100 or the method 200 described herein. Alternatively, the data processing system 400 may be a non-specific computing device such as, for example, a desktop computer, or mobile computing device, configured to perform the method 100 or the method 200 as described above.

The described embodiments may enable a data processing system including a computer vision system to take appropriate action based on sensor defect state data. Such action may prevent an accident from occurring, for example where the sensor defect state data relates to defects an in an image sensor used by the computer vision system to maneuver a vehicle. Furthermore, the described embodiments may enable action to be performed based on zone-wise sensor defect state data. This may allow such actions to be performed based on features identified in specific zones of an image.

What is claimed is:

1. A method of image processing comprising:
obtaining image data representative of a plurality of pixels of an image, the image data comprising a plurality of pixel intensity values respectively representing said pixels;
determining a plurality of zones of the image, each said zone comprising a respective group of said pixels, the respective groups comprising pixels from at least two rows of the image, each respective group comprising pixels from at least two columns of the image;
identifying one or more compromised pixel intensity values in a plurality of given zones;
generating counts of the identified compromised pixel intensity values, the counts relating to respective zones of the given zones;
generating zonal sensor defect state data relating to the generated counts; and
outputting the zonal sensor defect state data.

2. The method of claim 1, comprising determining whether a count of the generated counts meets a zonal defect condition, wherein the zonal sensor defect state data comprises a data element that represents whether the count meets the zonal defect condition.

3. The method of claim 1, wherein the zonal sensor defect state data comprises first zonal sensor defect state data relating to a first count of the generated counts, and second zonal sensor defect state data relating to a second count of the generated counts, and outputting the zonal sensor defect state data comprises outputting the first zonal sensor defect state data at a first time, and outputting the second zonal sensor defect state data at a second time later than the first time.

4. The method of claim 1, comprising:
for each given zone, determining whether the respective count of the generated counts meets a zonal defect condition; and
determining a number of the given zones in which the respective count meets the zonal defect condition, wherein the zonal sensor defect state data comprises a data element representing the number.

5. The method of claim 4, wherein the plurality of given zones forms a given macro-zone of a plurality of macro-zones of the image.

6. The method of claim 1, comprising, based on the generated counts, determining whether a collective count of the one or more compromised pixel intensity values for the image meets a sensor defect condition, wherein the zonal sensor defect state data comprises a data element representing whether the collective count meets the sensor defect condition.

7. The method of claim 6, wherein the plurality of zones comprises a further zone, and the method comprises:
identifying one or more compromised pixel intensity values in the further zone;
generating a further count of the identified compromised pixel intensity values in the further zone;
generating further zonal sensor defect state data relating to the further count; and
outputting the further zonal sensor defect state data, wherein outputting the zonal sensor defect state data is performed at a first time, and outputting the further zonal sensor defect state data is performed at a second time later than the first time.

8. The method of claim 1, wherein the image data was captured by an image sensor, the plurality of pixel intensity values represent said pixels at a first capture time, the one or more compromised pixel intensity values form a first set of compromised pixel intensity values, and the method comprises:
obtaining further image data representative of a further image captured by the image sensor, the further image data comprising a plurality of further pixel intensity values respectively representing, at a second, different, capture time, at least the pixels in a particular zone, wherein the plurality of further pixel intensity values comprises a second set of one or more compromised pixel intensity values;
identifying compromised pixel intensity values in the particular zone;
generating a later count of the identified compromised pixel intensity values, the later count relating to the particular zone;
generating further sensor defect state data relating to the later count; and
comparing the zonal sensor defect state data with the further sensor defect state data, thereby monitoring a change in a defect state of the image sensor.

9. The method of claim 1, wherein the method is performed in a data processing system comprising a computer vision system, and the method comprises:

performing, using the computer vision system, a feature recognition process on the image data; and performing an action based on the zonal sensor defect state data.

10. The method of claim 1, wherein the zonal sensor defect state data comprises a defect likelihood for a given said pixel intensity value.

11. The method of claim 9, wherein performing the feature recognition process comprises:

determining a feature presence likelihood for a feature in the image;

comparing the feature presence likelihood to a detection condition, wherein the detection condition is dependent on the zonal sensor defect state data; and determining that the feature is present if the feature presence likelihood meets the detection condition.

12. The method of claim 1, comprising:

generating a count of the identified compromised pixel intensity values; and determining whether the count meets a sensor defect condition, wherein the sensor defect state data comprises a data element that represents whether the count meets the sensor defect condition.

13. The method of claim 12, wherein the image data was captured by an image sensor mounted to a vehicle, and if it is determined that the count meets the sensor defect condition, the action comprises:

generating an alert that indicates that the sensor defect condition is met; and/or maneuvering the vehicle.

14. The method of claim 9, wherein the image data was captured by an image sensor mounted to a vehicle, and the action comprises maneuvering the vehicle.

15. The method of claim 9, wherein the image data was captured at a first time and the method comprises:

obtaining further image data representative of a plurality of further pixels of a further image, the further image data comprising a plurality of further pixel intensity values respectively representing said further pixels, wherein the further image data was captured at a second time later than the first time;

identifying one or more further compromised pixel intensity values in the plurality of further pixel intensity values;

comparing pixel locations corresponding to the identified compromised pixel intensity values to pixel locations corresponding to the identified further compromised pixel intensity values; and based on said comparison, identifying a movement of at least one of the identified compromised pixel intensity values.

16. The method of claim 15, wherein:

identifying the one or more compromised pixel intensity values comprises comparing at least one of the plurality of pixel intensity values to a defect condition for detecting defects; and the action comprises, in response to identifying the movement, modifying the defect condition to obtain a further defect condition for detecting defects.

17. The method of claim 15, wherein:

the method comprises correcting the one or more compromised pixel intensity values using a correction method for correcting defects; and the action comprises, in response to identifying the movement, modifying the correction method to obtain a further correction method for correcting defects.

18. A system comprising a data processor and data storage, the data storage comprising instructions which, when executed by the data processor, cause the data processor to:

obtain image data representative of a plurality of pixels of an image, the image data comprising a plurality of pixel intensity values respectively representing said pixels;

determine a plurality of zones of the image, each said zone comprising a respective group of said pixels, the respective groups comprising pixels from at least two rows of the image, each respective group comprising pixels from at least two columns of the image;

identify one or more compromised pixel intensity values in a plurality of given zones;

generate counts of the identified compromised pixel intensity values, the counts relating to respective zones of the given zones;

generate zonal sensor defect state data relating to the generated counts; and output the zonal sensor defect state data.

19. A non-transitory computer readable medium comprising instructions which, when executed by a data processor, cause the data processor to:

obtain image data representative of a plurality of pixels of an image, the image data comprising a plurality of pixel intensity values respectively representing said pixels;

determine a plurality of zones of the image, each said zone comprising a respective group of said pixels, the respective groups comprising pixels from at least two rows of the image, each respective group comprising pixels from at least two columns of the image;

identify one or more compromised pixel intensity values in a plurality of given zones;

generate counts of the identified compromised pixel intensity values, the counts relating to respective zones of the given zones;

generate zonal sensor defect state data relating to the generated counts; and output the zonal sensor defect state data.

* * * * *